Figure 1:
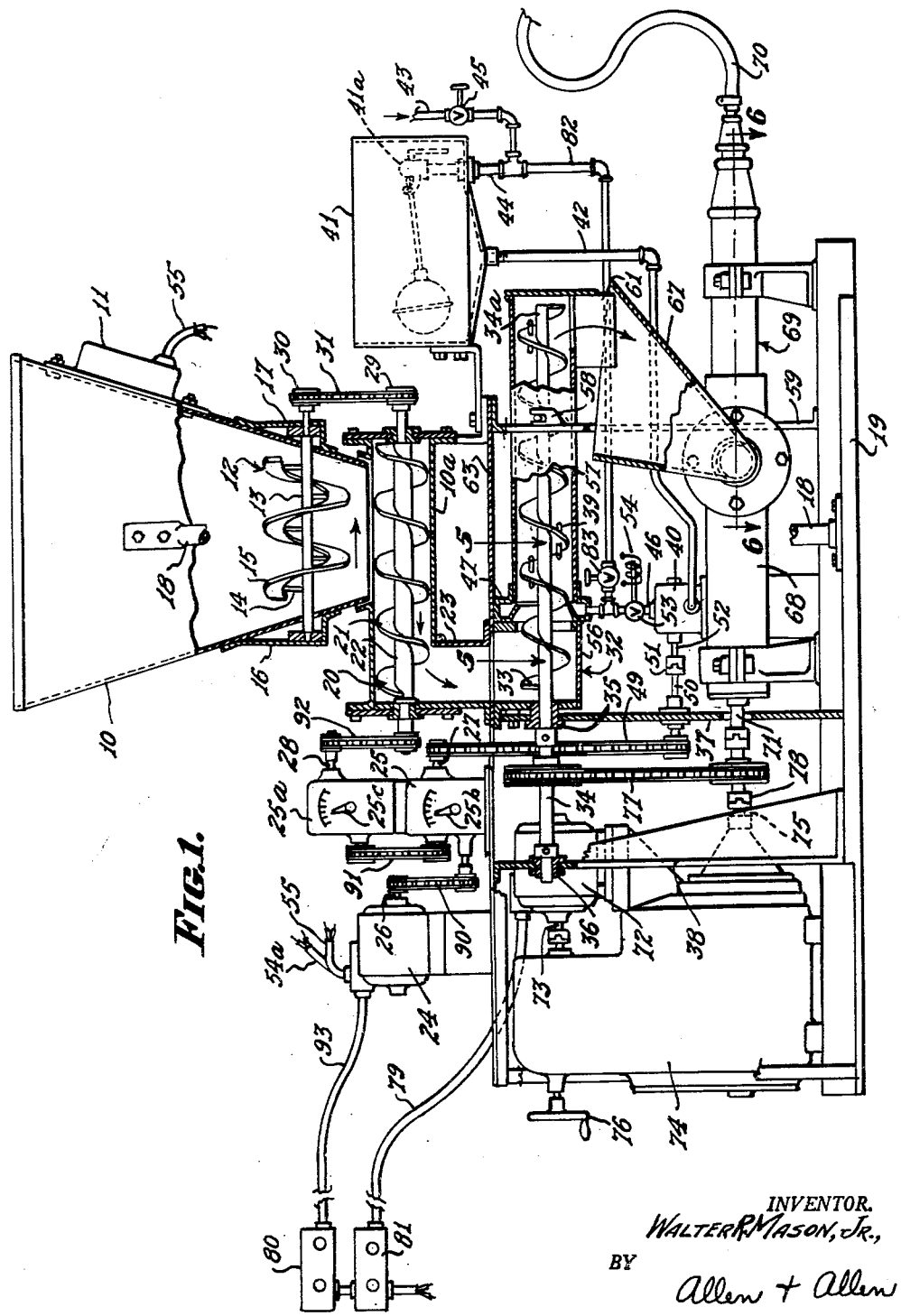

Oct. 31, 1961 W. R. MASON, JR 3,006,615
CONTINUOUS MIXING, METERING AND DELIVERING APPARATUS
Filed July 5, 1957 2 Sheets-Sheet 1

INVENTOR.
WALTER R. MASON, JR.,
BY Allen + Allen
ATTORNEYS.

Oct. 31, 1961 W. R. MASON, JR 3,006,615
CONTINUOUS MIXING, METERING AND DELIVERING APPARATUS
Filed July 5, 1957 2 Sheets-Sheet 2
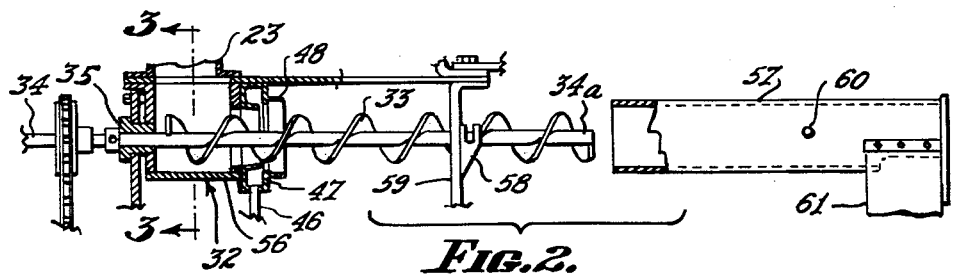
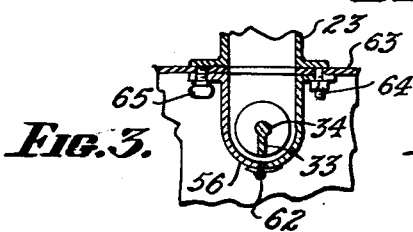
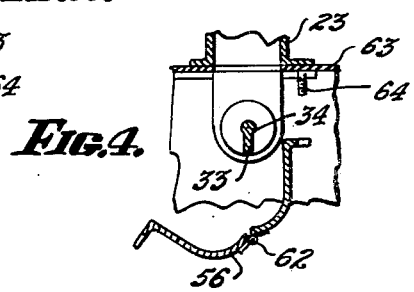
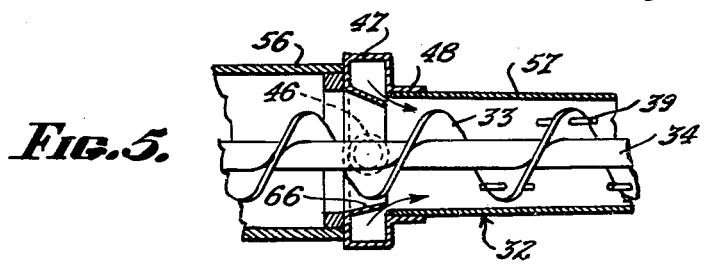
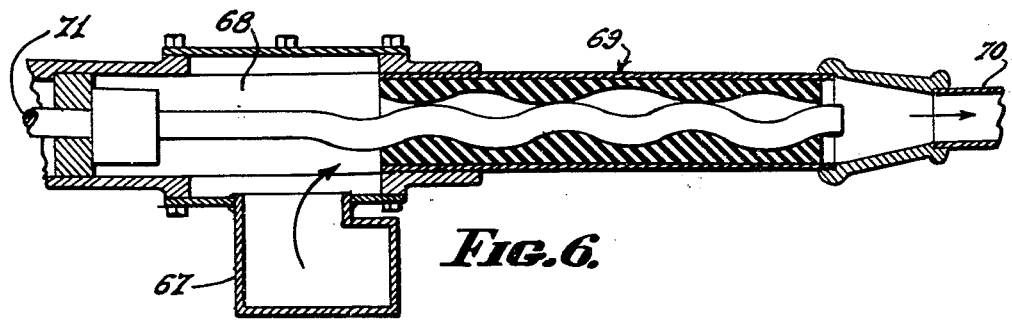
INVENTOR.
WALTER R. MASON, JR.,
BY
Allen + Allen
ATTORNEYS.

United States Patent Office 3,006,615
Patented Oct. 31, 1961

3,006,615
CONTINUOUS MIXING, METERING AND DELIVERING APPARATUS
Walter R. Mason, Jr., Cincinnati, Ohio, assignor to Hoge Warren Zimmermann Co., Cincinnati, Ohio, a corporation of Ohio
Filed July 5, 1957, Ser. No. 670,282
10 Claims. (Cl. 259—154)

My invention resides in the provision of novel apparatus designed for the continuous mixing, metering and delivering of a slurry of plaster and water although it will be readily apparent that the apparatus is quite capable of handling other dry materials and other fluids.

A very important object of my invention is to provide apparatus of the type described which will accurately proportion the plaster and water.

Another important object of this invention is to provide apparatus which will swiftly and completely mix the dry material and fluid into a homogeneous mixture.

Another important object of this invention is to provide apparatus of the type described in which the proportions of dry material and fluid may be varied, even during actual operation of the apparatus if required, so as to obtain any desired consistency.

Another important object of the invention is to provide apparatus which is more or less self-cleaning during operation and which can be completely cleaned when desired with a minimum amount of difficulty.

It is also an object of this invention to provide apparatus by which dry material and water may be mixed so as to effect a considerable saving in labor time.

In the further description of the invention to follow the apparatus will be described in terms of mixing plaster and water; this is exemplary only. Although the apparatus is especially suitable for the mixing of plaster and water, particularly in the making of plaster molds, it will be understood that such apparatus is capable of numerous other uses. In Patent No. 2,538,891 to R. F. Zimmerman et al. there is disclosed a continuous mixing and delivering apparatus especially designed for mixing dry calcined gypsum with water in order to form a slurry which may be pumped to form a roof deck. Although there are certain similarities in the apparatus and even the method it will be quite apparent that the instant invention, although designed for a somewhat different application, constitutes an improvement over the apparatus shown in the aforementioned patent.

This invention will be readily understood from the following description and with reference to the accompanying drawings, in which drawings like numerals are employed to designate like parts and in which:

FIGURE 1 is a front elevation with parts in section and parts broken away showing the apparatus of this invention, FIGURE 2 is a fragmentary exploded view, with parts in section, of a portion of the apparatus, FIGURE 3 is a section on the line 3—3 of FIGURE 2, FIGURE 4 is a view similar to that of FIGURE 3 but showing the parts in another relationship, FIGURE 5 is an enlarged section taken on the line 5—5 of FIGURE 1, and FIGURE 6 is an enlarged section taken on the line 6—6 of FIGURE 1.

Referring now particularly to FIGURE 1 there is disclosed a hopper 10 to one side of which is fastened conventional vibrating means 11. In the bottom portion of the hopper is a screw 12. Preferably this screw is a ribbon type screw by which I mean to define a screw which is more or less open in the region of the screw shaft 13. Braces 14 maintain the flights 15 of the screw in proper relationship to such shaft. The screw shaft 13 is journaled in bearings 16 and 17 supported from the hopper 10. The hopper itself is mounted in frame structure generally indicated at 18 and based on a section 19.

Immediately below the screw generally indicated at 12 is another screw which is generally indicated at 20. Preferably this screw is a solid flight screw by which I mean to indicate that type of screw in which the flights 21 blend directly with the screw shaft 22. This screw 20 is housed within a section 10a which may be thought of as a portion of the hopper 10. It will be apparent that the screw 12 is in a less restricted part of the hopper 10 than is the screw 20. Preferably the flights of the screws 12 and 20 are quite close together, in the neighborhood of one inch apart.

It should be understood that a third or fourth screw could be incorporated, each larger in diameter than the one beneath and thus more free and open to receive plaster without bridging—each feeds to the one beneath.

The provision and arrangement of the screws 12 and 20 constitutes an important feature of this invention. Final discharge from the hopper 10 is indicated at 23. It is highly desirable that the dry material discharged at this point is properly controlled and that each rotation of the screw 20 will produce a constant amount of discharged material. This I have accomplished by arranging the screws 12 and 20 in the manner illustrated as will be further described shortly. It is quite important that the screws 12 and 20 feed in opposite directions and, of course, that the screw 20 feeds so as to force dry material towards the discharge passage 23. The screw 12 is preferably of larger diameter than that of the screw 20. The action of this screw is to force the dry material towards that end of the hopper remote from the discharge passage 23. The open flight screw imparts a sort of slicing action which, combined with the vibrating hopper itself, serves to keep the material from packing too tight. The open flights permit the material to move backward along the screw shaft 13 should a packing condition arise. The centrifugal force of this screw 12, plus gravity, insures that the dry material will be forced towards the screw 20. This arrangement of the screws 12 and 20 insures that the flights of the screw 20 will receive the maximum amount of dry material without the formation of pockets. In this manner that material which is brought to the discharge passage 23 by the screw 20 arrives in constant even quantities.

Rotation of the screws 12 and 20 is accomplished as follows. At 24 I have generally indicated a motor which is connected to a conventional speed control unit 25. This unit 25 includes an auxiliary unit 25a. Conventional gearing 90 operatively connects the unit 25 to the motor output shaft 26 while the units 25 and 25a are operatively connected by conventional gearing 91. The output shaft from the speed control unit 25 is indicated at 27 and that from the unit 25a at 28. The screw shaft 22 is journaled in the end sections of the housing portion 10a and is connected by conventional means generally indicated at 92 to the output shaft 28. At its other end the screw shaft 22 has a sprocket 29 mounted thereon. The corresponding end of the screw shaft 13 is also provided with a sprocket 30, these gears being connected by a conventional chain 31. From this arrangement and the fact that one screw has a left hand flight and the other a right hand flight it will be apparent that the screws 12 and 20 feed in opposite directions as desired. Rotation of the screw 12 will push the dry material towards the right side of the hopper 10, as viewed in FIGURE 1, while rotation of the screw 20 will force the dry material in the opposite direction.

Movement of such material by these screws 12 and 20 is indicated by the arrows supplied in FIGURE 1.

The arrangement so far described insures positive control of the dry material. This material is to be mixed with water. In order to accomplish this the material discharged through the passage 23 is received in a mixing tube generally indicated at 32. A mixing screw 33 extends within the mixing chamber 32. Preferably the shaft 34 of the mixing screw 33 is cantilevered and journaled in bearings located outside of the chamber 32. It will be observed that I have indicated these bearings at 35 and 36 in FIGURE 1, such bearings being located in frame sections 37 and 38. The end of the shaft 34 within the chamber 32, as indicated at 34a, is free and not supported by any bearings or the like located where slurry could impinge on them. The flights of the screw 33, which is also a solid flight screw, are provided with lugs 39 to aid in the mixing of the dry material and fluid as it is moved by this screw through the mixing chamber 32.

Water is introduced within the chamber 32 as follows. At 40 I have illustrated a positive displacement water metering pump which is supplied with water from a reservoir 41 through a conduit 42. Water is got to the reservoir 41 through the conduits 43 and 44 leading from a water supply which is not illustrated. A valve 45 controls admission of water from the line 43 to the line 44 and reservoir 41. A second float operated valve 41a maintains a constant water level within the reservoir 41. The purpose in arranging the supply to the water metering pump 40 through the reservoir 41 in this manner is to insure a constant head against this pump so that an even discharge of water from the pump may be obtained. Water from the pump 40 flows through a conduit 46 into a ring 47 surrounding the mixing chamber 32 and mixing screw 33 as will be described in greater detail shortly.

The positive displacement water metering pump 40 is driven as follows. The speed control unit 25 has an output shaft 27 which is connected by gear and chain generally indicated at 49 to the shaft 50 which is in turn coupled at 51 to the operating shaft 52 of the pump 40. By this arrangement the consistency of the mixture, that is, the ratio of plaster to water, can be varied. It is also possible to maintain the proportions steady and vary the quantity of the mixture. In this manner the user can have any type of slurry he desires and as much or as little of it as he wants.

The speed changer 25a is powered by the motor 24 through the gearing 90, speed changer 25 and gearing 91. The speed of rotation of the output shaft 28 of the speed changer 25a may be regulated by manipulation of the lever 25c. Manipulation of this lever will have no effect on the speed of rotation of the output shaft 27 of the speed changer 25. Thus the proportion of dry material to fluid may be varied by manipulation of the lever 25c of the speed changer 25a since this will result in a greater or lesser amount of dry material being forced through the passage 23 while the positive displacement water metering pump 40 is driven at a constant speed.

Once the desired ratio of dry material to fluid has been selected as largely controlled by manipulation of the lever 25c in the manner just described, the total quantity of dry material and water introduced within the mixing tube 32 may be varied by manipulation of the lever 25b for the speed changer 25. In this connection it will be observed that the positive displacement water metering pump 40 is driven from the output shaft 27 of the unit 25 through the gearing 49, 50, 51 and 52. A change in the speed of the output shaft 27 also effects the speed of the output shaft 28 since the units 25 and 25a are connected together as generally indicated at 91. Thus an increase or decrease in the amount of water as determined by manipulation of the lever 25b of the unit 25 will be accompanied by a similar increase or decrease in the amount of dry material fed by the screw 20.

From the above it will be apparent that for a given amount of water as governed by the unit 25 and control lever 25b, a desired amount of dry material may be selected by manipulation of the lever 25c for the speed changer 25a. These adjustments set the proportions. If the operator desires to keep the same proportions but in increased or decreased quantities of the mixture as a whole, it is necessary for him then only to effect further manipulation of the lever 25b as above explained.

A valve 53 in the conduit 46 and associated solenoid 54 are also provided. The electric control circuit 93 for the motor 24 includes a lead 54a to energize the solenoid 54 and a lead 55 to energize the vibrating unit 11. The solenoid valve 53 is normally closed. When the motor 24 is actuated by energization of the circuit 93, as will be discussed in greater detail shortly, the vibrating unit 11 is simultaneously actuated and the solenoid valve 53 opened. Thus the water pump 40 and solenoid valve 53 are energized on the same electrical circuit and the valve opens when the pump turns. This solenoid valve 53 has a double purpose. First, it prevents leakage which occurs through the pump. Second, it limits the amount of water which will over-run after the control circuit 93 has been de-energized.

Referring now also to FIGURE 2 I have shown the mixing chamber 32 in greater detail. This chamber is actually comprised of two basic sections 56 and 57. The ring 47 earlier mentioned is fixed adjacent the section 56. Projecting from one side of the hollow ring 47 is an annular flange 48. A slotted lug 58 on a frame member 59 is adapted to receive a pin 60 extending from the mixing chamber section 57. A discharge conduit 61 is fixed to one end of the section 57. It will be apparent that when the mixing chamber 32 is in the assembled condition of FIGURE 1 the section 57 will have a bearing in the flange 48 and the pin 60 will rest in the slot of the lug 58. By this arrangement the mixing chamber is easily opened for cleaning if necessary. Also the tube cannot back off nor twist since the direction of rotation forces the lug into the slot. The section 56 is made in two portions which are pivotally connected as indicated at 64 and 65. This is shown in greater detail in FIGURES 3 and 4.

In FIGURE 5 I have shown the water ring 47 in greater detail. This ring is provided with an annular slot through which water is discharged within the chamber 32. A baffle 66 is provided in connection with such annular slot so that the water is directed towards the free end 34a of the mixing screw 33. Thus the water is directed into the section 57 of the chamber 32 while dry material from the conduit 23 enters the chamber 32 in the region of the section 56, the hollow ring 47 being between such sections 56 and 57. This arrangement of the ring 47 and its baffle 66 prevents splash-back of water into the dry material being initially introduced This is a very desirable feature of the invention.

The slurry of initially dry material as mixed with fluid in the chamber 32 is discharged from the conduit 61 into a receptacle 67. This receptacle in turn terminates in the entrance section 68 of a positive displacement pump generally indicated at 69. The pump is now conventional and well known in the art. Further mixing of the initially dry material and fluid is accomplished in this pump as the slurry is discharged through the conduit and hose 70 by which the final mixture is delivered to the desired spot.

The screw shaft 34 and pump shaft 71 are driven as follows. A second motor 72 is suitably mounted on frame structure extending from the base 19. The output shaft 73 of this motor terminates within an infinitely variable Reeves speed changer 74 having an output shaft 75. This unit 74 is conventional and thus has not been illustrated in detail. It will be understood by those skilled in the art that the speed of the shaft 75 may be regulated by manipulation of the control handle 76. The shafts 34 and 71 are connected by conventional gear chain arrangement generally indicated at 77, the shaft 71 being coupled to the output shaft 75 of the unit 74 as generally indicated at 78. In this manner simultaneous control of the mixing screw 33 and pump 69 is obtained.

Preferably the pump 69 is a progressing cavity pump according to the inveniton of R. J. L. Moineau. As above noted this pump is driven driven through an infinitely variable Reeves speed changer. The purpose of this is to make it possible to handle any through-put (within the machine limits) and also to make it possible to balance exactly the amount of slurry delivered to the pump with that being pumped. Usually it is advantageous to have the slurry pump hopper 67 partly filled with slurry in order to avoid sucking air into the pump 69. This is accomplished by slowing the Moineau pump 69 down for a few seconds, allowing the level to build up within the slurry pump hopper 67 and then speeding the pump up again to balance exactly the quantity of slurry being delivered.

The control circuit for the motor 72 is generally indicated at 79. Conventional start-stop means 80 and 81 are provided for the circuits 93 and 79 respectively. It will be apparent that the means 80 controls vibration of the hopper 10, actuation of the screws 12 and 20, introduction of the fluid by the positive displacement metering pump 40 and solenoid valve 53. The means 81 controls actuation of the mixing screw 33 and pump 69. Water under line pressure may be introduced within the mixing tube 32 from the supply conduit 43 and auxiliary conduit 82 by opening the hand valve 83, the valve 45 being also open.

The preferred operation of this apparatus is as follows. A quantity of plaster is dumped within the hopper 10. Water is introduced within the reservoir 41 as controlled by the valve 45 and float valve 41a. The start buttons of the means 80 and 81 are actuated. Such actuation of the means 80 starts the vibrator 11, rotation of the agitator screw 12 and delivery screw 20, the pump 40 is at the same time thus put into operation and the solenoid valve 53 is opened. In this manner metered quantities of dry material and fluid are introduced within the mixing chamber 32, as determined by the setting of lever 25c with respect to lever 25b, and the total quantity so introduced may be regulated by manipulation of the control handle 25b. The means 81 having also been actuated, the dry material is forced by the screw 33 through the mixing chamber 32 towards the discharge conduit 61. Water introduced through the ring 47 is directed away from the chamber section 56 so that premature caking of the dry material is prevented. The screw 33 and its lugs 39 mix the slurry to a considerable extent within the chamber 32. This slurry is then received within the receptacle 67. Further mixing of this slurry is accomplished not only within the pump 69 but also by turbulent flow within the hose 70 as is described in greater detail in the aforementioned patent.

The arrangement of the screws 12 and 20 insures the fact that a given rotation of the screw 20 will discharge a constant given amount of dry material into the section 56 of the mixing chamber 32. Similarly the constant pressure head against the pump 40 as achieved by the reservoir arrangement 41 insures that a given amount of water will be discharged into the mixing section 57 of the chamber 32 upon a given rotation of the shaft 52.

When a mold or the like is being filled with slurry delivered from the hose 70 and it is desired to stop the machine, the procedure is as follows. First the stop button of the means 80 for the feed of dry material as controlled by the vibrator 11, screw 12 and screw 20, along with the introduction of water as controlled by the pump 40 and solenoid valve 53, is pressed about ten seconds before the mold is filled. Meanwhile the mixing screw 33 and slurry pump 69 are permitted to continue running with the result that the slurry flows out of the mixing chamber until it is empty and out of the slurry pump hopper until it is empty. When the slurry pump hopper 67 is empty, nothing further goes through the slurry pump 69 even through it is still running and the hose thus remains full of plaster slurry.

Second, the wash water is cut into the system by manipulation of the hand valve 83 and this water begins washing out the mixing chamber 32 and the mixing screw 33, such water thus filling the slurry pump hopper 67. The slurry pump 69 is still running so that this last mentioned water is immediately pumped into the hose 70 and as this happens the plaster slurry is forced out of the hose at the discharge end. There is only a small amount of plaster that is diluted and nearly all the plaster in the hose is therefore usable. When the water finally is discharged from the hose it is readily apparent to the operator. In practice the mold maker will time it almost to the second so that he knows the instant the wash water is about to hit and so that the mold is not diluted and yet almost no plaster is wasted. This wash-out procedure normally takes about fifteen seconds after which the machine is clean and ready to pour again.

Third, upon completion of the wash-out as above described the stop button of the means 81 is pressed whereby the motor 72 driving the mixing screw 33 and slurry pump 69 is stopped.

It is to be understood that although I have shown my invention as embodied in particular apparatus and certain structures this is exemplary only and I do not intend to be limited to such apparatus and structures except insofar as these are specifically set forth in the subjoined claims. In this connection it will be further understood that various modifications may be made in the basic apparatus and arrangement of this invention without departing from the scope and spirit of the basic inventive concept by which this apparatus has been achieved.

Having thus described my invention, what I claim as new and what I desire to protect by United States Letters Patent is:

1. A continuous metering, mixing and delivery apparatus comprising a hopper for dry material, a ribbon type conveyor horizontally disposed in the lower part of said hopper, a solid flight metering screw conveyor also disposed in said hopper beneath and parallel to said ribbon type conveyor, there being a relatively small space between said ribbon type conveyor and said solid flight conveyor, vibrating means for said hopper, said ribbon type conveyor urging the material in a given direction and said solid flight conveyor urging the material in the opposite direction, the delivery end of said ribbon type conveyor terminating adjacent the input end of said second screw, a water pump, means to maintain a constant head against said pump, a horizontal mixing tube, a conveyor screw in said mixing tube, said tube having a loading aperture at one end and a discharge opening at the other end, means for introducing material from said solid flight conveyor into said tube through said loading aperture, conduit means from said water pump to said tube, means adjacent said loading aperture to introduce water pumped through said conduit means by said water pump into said tube, a receptacle beneath said discharge opening to receive a slurry of mixed material and water from said tube, a slurry pump, means to introduce said slurry from said receptacle into said slurry pump, conduit means for leading the mixed slurry from said pump, and means to drive said ribbon type conveyor, said vibrating means, said water pump, said conveyor screw and said slurry pump, said last mentioned means including a first motor for driving said ribbon type screw, said solid flight screw and said water pump, and a second motor for driving said conveyor screw and said slurry pump.

2. The apparatus of claim 1 in which there is a first speed control unit for said first motor whereby the proportionate speeds of said solid flight screw conveyor and said water pump may be varied.

3. The apparatus of claim 1 in which there is a second speed control unit for said second motor whereby the speeds of said conveyor screw and said slurry pump are varied.

4. A continuous metering, mixing and delivery apparatus comprising a hopper for dry material, a ribbon type conveyor horizontally disposed in the lower part of said hopper, a solid flight metering screw conveyor also disposed in said hopper beneath and parallel to said ribbon type conveyor, there being a relatively small space between said ribbon type conveyor and said solid flight conveyor, vibrating means for said hopper, said ribbon type conveyor urging the material in a given direction and said solid flight conveyor urging the material in the opposite direction, the delivery end of said ribbon type conveyor terminating adjacent the input end of said second screw, a water pump, means to maintain a constant head against said pump, a horizontal mixing tube, a conveyor screw in said mixing tube, said tube having a loading aperture at one end and a discharge opening at the other end, means for introducing material from said solid flight conveyor into said tube through said loading aperture, conduit means from said water pump to said tube, means adjacent said loading aperture to introduce water pumped through said conduit means by said water pump into said tube, a receptacle beneath said discharge opening to receive a slurry of mixed material and water from said tube, a slurry pump, means to introduce said slurry from said receptacle into said slurry pump, conduit means for leading the mixed slurry from said pump, and means to drive said ribbon type conveyor, said vibrating means, said water pump, said conveyor screw and said slurry pump, the said means for introducing water into said mixing tube comprising a ring surrounding said tube and said conveyor screw, said ring having an annular slot therein, said conveyor screw extending through said ring, and baffle means for said ring to direct water along said conveyor screw away from said loading aperture whereby to prevent splashback.

5. A continuous metering, mixing and delivery apparatus comprising a hopper for dry material, a ribbon type conveyor horizontally disposed in the lower part of said hopper, a solid flight metering screw conveyor also disposed in said hopper beneath and parallel to said ribbon type conveyor, there being a relatively small space between said ribbon type conveyor and said solid flight conveyor, vibrating means for said hopper, said ribbon type conveyor urging the material in a given direction and said solid flight conveyor urging the material in the opposite direction, the delivery end of said ribbon type conveyor terminating adjacent the input end of said second screw, a water pump, means to maintain a constant head against said pump, a horizontal mixing tube, a conveyor screw in said mixing tube, said tube having a loading aperture at one end and a discharge opening at the other end, means for introducing material from said solid flight conveyor into said tube through said loading aperture, conduit means from said water pump to said tube, means adjacent said loading aperture to introduce water pumped through said conduit means by said water pump into said tube, a receptacle beneath said discharge opening to receive a slurry of mixed material and water from said tube, a slurry pump, means to introduce said slurry from said receptacle into said slurry pump, conduit means for leading the mixed slurry from said pump, and means to drive said ribbon type conveyor, said vibrating means, said water pump, said conveyor screw and said slurry pump, said last mentioned means including a first motor for driving said ribbon type screw, said solid flight screw and said water pump, and a second motor for driving said conveyor screw and said slurry pump, and including a first speed control unit for said first motor whereby the proportionate speeds of said solid flight screw conveyor and said water pump may be varied, and a second speed control unit for said second motor whereby the speeds of said conveyor screw and said slurry pump are varied.

6. A mixing apparatus comprising a hopper, a mixing chamber, feed means to deliver dry material from said hopper to said mixing chamber, a pump to deliver fluid to said mixing chamber, means to vary the proportion of dry material to fluid, and means to vary the total quantity of proportioned dry material and fluid delivered within the said mixing chamber, the said means to vary the total quantity of dry material and fluid comprising a first speed changer driven by said motor, the means to vary the proportion of dry material to fluid comprising a second speed changer driven from said first speed changer, said feed means being connected to said second speed changer, and said pump being connected to said first speed changer whereby a change in the setting of said second speed changer affects said feed means only and a change in the setting of said first speed changer affects both said feed means and said pump.

7. The apparatus of claim 6 including a fluid reservoir for said pump, conduit means from a supply of water to said reservoir, a float valve for said reservoir connected to said conduit means to control the level of water in said reservoir, and a normally closed solenoid valve between said pump and said mixing chamber, said solenoid valve being connected to a circuit including said motor, whereby when said motor is actuated said solenoid valve is opened.

8. The apparatus of claim 7 including means to introduce fluid into said mixing chamber separate from said pump and said reservoir.

9. The apparatus of claim 8 including a mixing means within said mixing chamber, a slurry pump to receive mixed material and fluid from said mixing chamber, separate means to control simultaneously the action of said mixing means and said slurry pump, and a second motor for said separate means, said second motor being in a circuit independent of said first mentioned motor.

10. A mixing apparatus comprising a hopper, a mixing chamber, feed means to deliver dry material from said hopper to said mixing chamber, a pump to deliver fluid to said mixing chamber, means to vary the proportion of dry material to fluid, and means to vary the total quantity of proportioned dry material and fluid delivered within the said mixing chamber, a fluid reservoir for said pump, conduit means from a supply of fluid to said reservoir, a float valve for said reservoir connected to said conduit means to control the level of fluid in said reservoir, whereby to maintain a constant head on said pump, a normally closed valve between said pump and said mixing chamber, a motor to drive said pump, and means to open said normally closed valve when said motor is actuated.

References Cited in the file of this patent

UNITED STATES PATENTS

| | | |
|---|---|---|
| 675,163 | Overton | May 28, 1901 |
| 1,324,930 | Schaffer | Dec. 16, 1919 |
| 1,423,853 | Hodgson | July 25, 1922 |
| 1,466,639 | Browne | Aug. 28, 1923 |
| 1,908,882 | Birkenbevel | May 16, 1933 |
| 2,299,565 | Colburn | Oct. 20, 1942 |
| 2,354,634 | Griswold | July 25, 1944 |
| 2,365,897 | Morgan | Dec. 26, 1944 |
| 2,521,398 | North | Sept. 5, 1950 |
| 2,538,891 | Zimmerman et al. | Jan. 23, 1951 |
| 2,543,517 | Anderson | Feb. 27, 1951 |
| 2,806,788 | Leker | Sept. 17, 1957 |